April 29, 1969     A. SALVI ET AL     3,441,841
METHODS AND DEVICES FOR COMPENSATION OF PARASITIC
MAGNETIC FIELDS, IN PARTICULAR ON AN AIRCRAFT
CARRYING A MAGNETOMETER Filed Feb. 3, 1967

Inventors
Antoine Salvi
Henri Glenat

BY *William A. Stokes*
ATTORNEY

Inventors
Antoine Salvi
Henri Glenat

BY *William J. Stokes*
ATTORNEY

United States Patent Office 3,441,841
Patented Apr. 29, 1969

3,441,841
METHODS AND DEVICES FOR COMPENSATION OF PARASITIC MAGNETIC FIELDS, IN PARTICULAR ON AN AIRCRAFT CARRYING A MAGNETOMETER
Antoine Salvi, Fontaine, and Henri Glenat, Grenoble, France, assignors to Commissariat à l'Energie Atomique, Paris, France
Filed Feb. 3, 1967, Ser. No. 613,892
Claims priority, application France, Feb. 4, 1966, 48,471
Int. Cl. G01r 33/02; H01s 4/00
U.S. Cl. 324—43                    4 Claims

ABSTRACT OF THE DISCLOSURE

There is determined, by means of two magnetometer heads, the total magnetic field difference between two points where the intensity of the external magnetic field is substantially the same but the intensities of the parasitic magntic field are different. With a phase discriminator and a converting unit, there is produced a control magnitude substantially proportional to this difference, and therefore to the parasitic magnetic field difference, and there is produced, in response to variations of said magnitude, by means of a pair of coils, a compensation magnetic field which cancels said difference.

---

The present invention relates to methods and devices for the compensation of parasitic magnetic fields. The invention is more especially, but not exclusively concerned, with compensation methods and devices for use on board of an aircraft carrying a magnetometer, in particular of the nuclear magnetic resonance type, in order to reduce the disturbances in the measurement of the external magnetic field resulting from such a parasitic magnetic field.

The chief object of our invention is to provide improvements in methods and devices of the above mentioned kinds, said improvements relating both to the accuracy and to the automaticity of the compensation.

The method according to the present invention comprises determining the difference between the respective values of the total magnetic field at two points where the external magnetic field intensity is substantially the same whereas the respective values of the parasitic magnetic field at these points are different, producing a control magnitude, and in particular a current intensity, substantially proportional to this difference and therefore to the parasitic magnetic field, and producing, in response to variations of said magnitude, a compensation magnetic field of a direction opposed to that of said parasitic magnetic field and of an intensity substantially proportional to said magnitude, so as to cancel said difference.

The device for the compensation of parasitic magnetic fields according to the above method is characterized in that it comprises, in combination, means producing an electric current of an intensity substantially proportional to the difference between the respective magnetic field values at two points where the intensity of the external magnetic field is substantially the same whereas the intensities of the parasitic magnetic field are different, conducting wire coils and means for feeding said current to said coils, the arrangement of said coils and the coefficient of proportionality between said electric current and said magnetic field difference being such that said coils produce a compensation magnetic field which cancels said difference.

According to other advantageous but not necessary features of the invention: we dispose:

At one of the above mentioned points, a magnetometer head delivering a first voltage of a frequency proportional to the intensity of the magnetic field at this point and a frequencymeter acted upon by said first voltage determining the intensity of the external magnetic field when the parasitic magnetic field is compensated for, and, at the other point, a nuclear filter of the type described in the patent application filed on even date (Feb. 3, 1967) by Paul Raffini, Francis Roback, and Antoine Salvi for "Improvements in Devices for Measuring Magnetic Field Gradients," Ser. No. 613,869 receiving at its input a portion of said first voltage and delivering at its output a second voltage phase shifted with respect to the first one by an angle proportional to the difference of the respective intensities of the total magnetic fields at these two points, a unit receiving both of said voltages and delivering a third voltage proportional to the shift angle, and a unit for reducing from said thid voltage a current intensity proportional thereto and which is applied to said coils to produce the compensation magnetic field;

For compensation on board of an aircraft, the two points are located substantially in the vertical plane of symmetry of the aircraft, along an axis thereof, one behind the other toward the tail of the aircraft, preferably at a distance of some decimeters, and the coils are disposed in the vicinity of the barycenter of the magnetic masses of the aircraft, the respective axes of said coils forming with the above mentioned aircraft axis a trirectangular trihedron.

The present invention applies more particularly to nuclear magnetic resonance magnetometers, in particular of the type described in our above mentioned patent application Ser. No. 613,869 filed on even date.

A preferred embodiment of the present invention will be hereinafter described with reference to the appended drawings, given merely by way of example, and in which.

Figure 1:
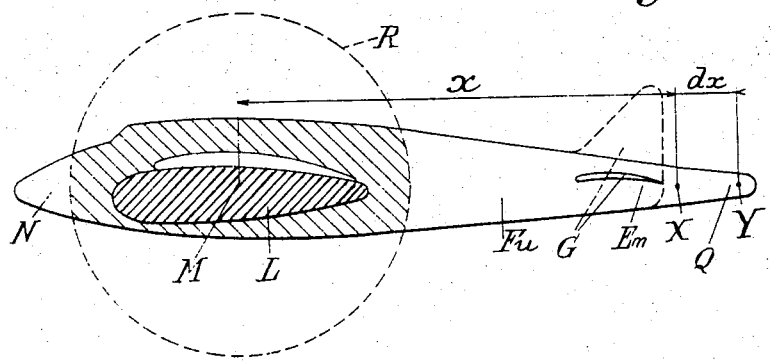
FIG. 1 is a diagrammatic side elevational view, with a part in section, of an aircraft wherein there exists a parasitic magnetic field.

In FIG. 1 we have diagrammatically shown an aircraft with its nose N, its fuselage Fu, its wings L, its control surfaces G mounted at the rear end Em of the fuselage and its tail Q. It is known that most of the apparatus present on board of the aircraft (engines, electrical and electronic equipment, luggage compartments, tanks, etc.) requiring a permanent magnetic compensation are contained in a substantially spherical region R located at the front part of the aircraft, the center of said region R coinciding substantially with the barycenter M of the magnetic masses of the aircraft. The apparatus in sphere R have a greater influence upon a magnetometer head located at X, at a distance x from barycenter M than upon a magnetometer head disposed at Y, at a distance x+dx from barycenter M. In FIG. 1 Y is located in the tail Q of the aircraft, whereas X is located between said tail and sphere R. As a matter of fact these two positions of X and Y are the preferred positions of the two points between which is determined the total magnetic field difference in the method and/or the device according to the present invention.

At X, same as at Y, the total magnetic field is essentially equal to the sum of two terms, to wit the external magnetic field (that is to say the field that would exist at these point in the absence of the aircraft in the position shown) and the parasitic magnetic field produced by the aircraft, essentially by the apparatus carried by it in zone R.

Therefore, a measurement of the total magnetic field at X or at Y (or at any other point of the aircraft) by means of a highly accurate magnetometer does not permit of measuring the exact intensity of the external magnetic field, since the latter is modified by the intensity of the parasitic magnetic field. The magnetometer measures the total magnetic field consisting of the geometrical sum of the external magnetic field and the parasitic magnetic field.

This constitutes a very serious drawback when it is desired to perform very accurate measurement of the intensity of the earth magnetic field and of its variations, in particular for prospecting or detecting purposes.

In order to permit an accurate measurement, according to the present invention, we determine the difference between the values of the total magnetic field intensity at points X and Y (where the intensity of the external magnetic field is the same, while the intensities of the parasitic magnetic field are different), we produce a control magnitude, in particular a current intensity, substantially proportional to this difference, and therefore to the parasitic magnetic field, and we produce, in response to the value of said magnitude, a compensation magnetic field of a direction opposed to that of said magnetic field and of an intensity substantially proportional to said magnitude, in order to cancel said difference. Through this method, we create at points X and Y a compensation magnetic field the effect of which is to cancel the difference between the total magnetic fields at points X and Y by reducing the value of the total magnetic field at each of these points essentially to the value of the external magnetic field, which is the same at these two points, respectively.

Therefore if we measure the intensity of the magnetic field at X or Y by means of a magnetometer head, the value of this measurement is that of the intensity of the external magnetic field freed from the error due to the parasitic magnetic field.

Figure 2:
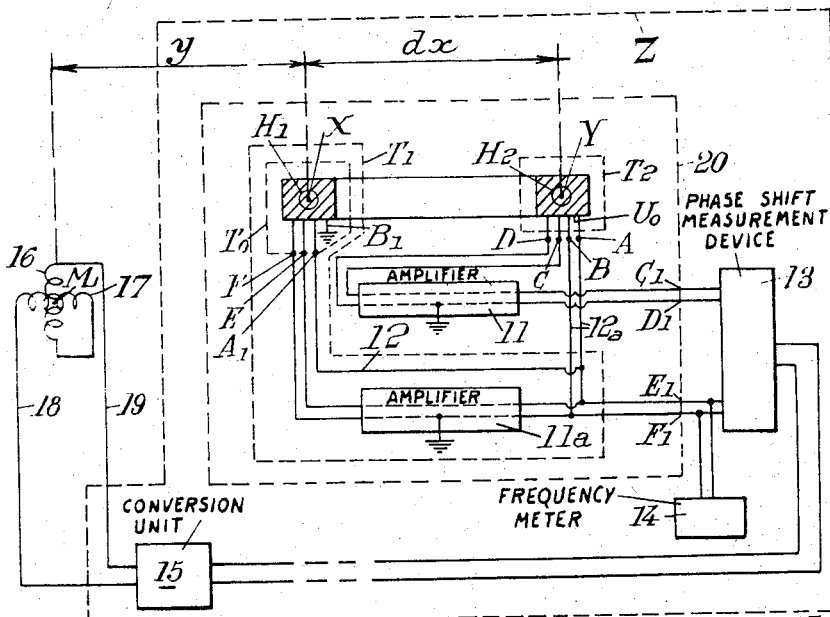
FIG. 2 shows a device for compensation of the parasitic magnetic fields made according to the present invention.

This method may be carried out by means of a device according to the invention as illustrated by FIG. 2.

The device comprises means Z producing an electric current of intensity $i$ substantially proportional to the difference between the respective values of the total magnetic field at points X and Y, coils 16 and 17, and conductors 18 and 19 for feeding said coils 16 and 17 with current $i$, the distance from said coils 16 and 17 to point $M_1$ and the coefficient of proportionality between said current $i$ and said difference being such that said coils create a compensation magnetic field cancelling said difference.

System Z may advantageously be made as disclosed in our above mentioned patent application of even date, comprising two magnetic resonance magnetometer heads located respectively at X, where the intensity of the total magnetic field is $H_1$, and at Y, where the intensity of the total magnetic field is $H_2$.

Head $T_1$, located at X, advantageously consists of a spin oscillator of the type described in the United States Patent No. 3,249,856 filed Dec. 27, 1963, and issued on May 3, 1966. Such an oscillator delivers at $E_1$, $F_1$ a sinusoidal voltage at a frequency which is exactly proportional to the intensity of the total magnetic field at point $H_1$. It essentially comprises a nuclear filter $T_0$ of the type illustrated by FIG. 3 of the appended drawings and which will be hereinafter described in more detail and an amplifier $11a$ without phase distortion, a portion of the output of this amplifier being fed back to the nuclear filter through conductor 12 to constitute a nuclear oscillator at said frequency.

Figure 3:
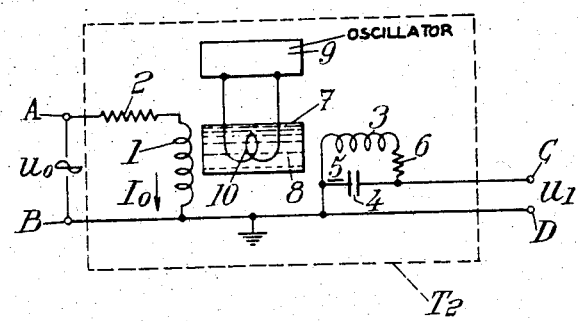
FIG. 3 illustrates a nuclear filter used in the device of FIG. 2.

The second head $T_2$, located at point Y, is a nuclear filter illustrated with more detail by FIG. 3, the input of this filter, applied at A, B, constituting of a portion of the output of amplifier $11a$ and therefore of head $T_1$, whereas its output, at C, D, is amplified in amplifier 11, the amplified output being available at $C_1$, $D_1$.

The nuclear filter of head $T_2$ (and also of head $T_1$) illustrated in FIG. 3, comprises two input terminals A, B ($A_1$, $B_1$ for $T_0$), between which are connected in series an input coil 1 and a resistor 2 of purely ohmic impedance much higher than the impedance of coil 1, whereby the voltage $U_0$ of the input sinusoidal signal applied across terminals A, B is practically in phase with the sinusoidal current $I_0$ flowing through coil 1.

In series with the terminals of output C, D, which deliver the output voltage $U_1$, are connected an output coil 3 and a resistor 6, lowering the Q coefficient of the resonant circuit 5 constituted by coil 3 and capacitor 4 in parallel with said coil.

Coils 1 and 3 are normally uncoupled with respect to each other but they are coupled by a system of spins (belonging to a liquid 8 contained in a vessel 7), this system of spins coupling output coil 3 with input coil 1 at the frequency of resonance of this system of spins in the magnetic field ($H_2$ for head $T_2$) in which it is located, this resonance frequency, called Larmor frequency, being proportional to the intensity of the magnetic field.

The adjustment is such that the resonance frequency of resonant circuit 5 is very close to the Larmor frequency, the reduced Q factor of circuit 5 being intended to reduce pulling, that is to say to prevent resonant circuit 5 from imposing its resonance frequency to the output of the filter.

In FIG. 3, the liquid 8 is a solution containing, in addition to the above mentioned system of spins, a paramagnetic substance which permits of bringing into action the Overhauser-Abragam effect when one of the electronic resonance lines thereof is saturated by means of coil 10 fed at this resonance frequency from an oscillator 9.

Complementary explanations concerning heads $T_2$ and $T_1$, and in particular to system of spins, are given in our above mentioned application Ser. No. 613,869 filed on even date. Besides, for the elements of the portion contained in rectangle 20, traced in dotted lines in FIG. 2, and for the elements of FIG. 3 of the appended drawings, we have used the same reference numerals as in said patent application.

Figure 4:
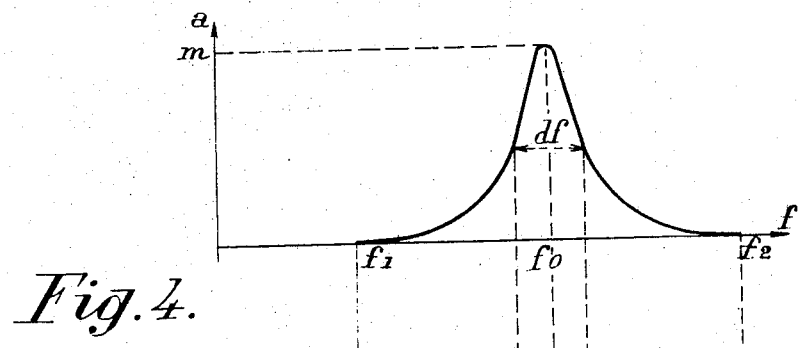
FIG. 4 illustrates the response of the filter of FIG. 3, that is to say the phase shift introduced by it.
Figure 4:
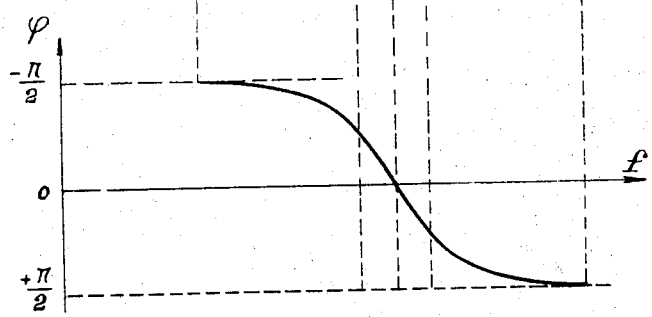

In FIG. 4, we have illustrated, at the upper part thereof, the resonance curve of the system of spins of the liquid 8 coupling coils 1 and 3 together at the resonance frequency $f_0$ and in the vicinity of this frequency, the width of the resonance band being indicated by $df$. In this upper part, we have shown the variations of the amplitude $a$ of the output voltage $U_1$ as a function of the frequency $f$ of the input voltage $U_0$ (it being supposed that the amplitude of $U_0$ is kept at a constant value, by varying only its frequency $f$).

As indicated in the above mentioned patent application Ser. No. 613,869, the response curve is of the Lorentz type, the maximum amplitude $m$ corresponding to frequency $f_0$.

At the bottom part of FIG. 4, we have shown, still as a function of $f$, and in correspondance with the upper portion of this figure, the phase shift $\varphi$. The latter is zero for $f_0$ and it varies between $-\pi/2$ and $+\pi/2$ when $f$ varies between values $f_1$ and $f_2$ for which $a$ is zero.

In the arrangement of FIG. 2, comparison between the phases of signal $U_4$ available at $E_1$, $F_1$ and of signal $U_1$ available at $C_1 D_1$ is performed in phase discriminator 13. When the magnetic field $H_2$ at Y is equal to the magnetic field $H_1$ at X, phase discriminator 13 delivers a voltage equal to zero. On the contrary, this voltage becomes positive (or negative) when $H_2$ increases (or decreases, respectively) relatively $H_1$. As stated in the above mentioned patent application Ser. No. 613,869, the sensitiveness is very high, the phase angle varying between $-\pi/2$ and $+\pi/2$ for small variations of $H_2$ from $H_1$. This permits of positioning points X and Y at a smaller distance from each other, this distance $dx$ being for instance of the order of 50 cms., which is advantageous because it facilitates equality of the form of the magnetic disturbances at X and Y.

We thus obtain, at the output of unit 13, a voltage which depends upon the magnetic field difference between points X and Y. This voltage is, after amplification in an amplifier not shown by the drawings, converted in conversion unit 15 into a current $i$ proportional to the difference between the magnetic field intensities $H_1$ and $H_2$ (when this difference is small, that is to say for the substantially rectilinear portion of the curve representing the variation of $\varphi$ in the vicinity of zero and practically within the band of width $df$). As above indicated, it is this current $i$ that is applied to coils 16 and 17 advantageously disposed with their respective axes perpendicular to each other and to the symmetry plane of the aircraft (plane of FIG. 1).

The device of FIG. 2 also supplies at $E_1$, $F_1$ a voltage of a frequency proportional to the intensity of magnetic field $H_2$. A frequency meter 14 connected across points $E_1$, $F_1$ therefore permits of determining the intensity of magnetic field $H_2$, this intensity being measured independently (as already above indicated and as it will be explained hereinafter in more detail) of the disturbances produced by the apparatus located in zone R. In order to show how the compensation of the disturbing magnetic fields is performed, we will calculate said disturbing fields and the compensation.

We call:

$x$ the distance from magnetic barycenter M to the point X where is located the first head $T_1$ (FIG. 1), $dx$ the distance between points X and Y where are located the two magnetometer heads $T_1$ and $T_2$ (FIGS. 1 and 2), $y$ the distance between point $M_1$, where compensating coils 16 and 17 are located, and point X (FIG. 2), and $k$ the product $\pi \mu_0$ ($\mu_0$ being the coefficient of the Coulomb equation for the magnetic masses, i.e. the magnetic permeability of vacuum).

We have for any disturbing magnetic mass $m$, disposed at point M:

a disturbing magnetic field at X equal to $$H_X = \frac{m}{k} \cdot \frac{1}{x^3}$$

and a disturbing magnetic field at Y equal to $$H_Y = \frac{m}{k} \cdot \frac{1}{(x+dx)^3}$$

The difference between these two disturbing magnetic fields is given by the following formula:

$$H_Y - H_X = \frac{m}{k}\left(\frac{1}{(x+dx)^3} - \frac{1}{x^3}\right)$$

Since $$(x+dx)^3 = x^3\left(1 + \frac{dx^3}{x}\right)$$

calling $p$ the value $dx/x$, we obtain:

$$H_Y - H_Y = \frac{m}{k} \cdot \frac{\frac{1}{(1+p)^3} - 1}{x^3}$$

Term $$\frac{1}{(1+p)^3}$$

may be expanded into Mac Laurain or binomial series as follows:

$$\frac{1}{(1+p)^3} = 1 + 3p + 6p^2 + 10p^3$$

$p = dx/x$ is small, which is the case (for instance, if $x = 10$ metres and $dx = 0.5$ metre, we have $$\frac{dx}{x} = \frac{1}{20}$$

it is found that the third term of the series is already negligible.

Finally we have substantially $$H_X - H_Y = \frac{m}{k} \cdot \frac{(1+3p) - 1}{x^3} = \frac{m}{k} \cdot \frac{3dx}{x^4} \quad (1)$$

This measured value of $H_X - H_Y$ is fed back, in negative feedback fashion, through coils 16 and 17 disposed at $M_1$. The total field distributed by these coils is directly proportional to this value and it is equal to $$-\frac{m}{k} \cdot \frac{3dx}{x^4} \cdot r$$

$r$ being a negative feedback loop coefficient.

The magnetic field difference between points X and Y due to this new compensation field is $$(H_X)_c - (H_Y)_c = -\frac{m}{k} \cdot \frac{3dx}{x^4} \cdot r \cdot \frac{3dx}{y^4} \quad (2)$$

The method according to the present invention has for its object to reduce to zero the difference between the total magnetic fields (due to the barycenter M magnetic masses and to coils 16 and 17 located at $M_1$), that is to say $$H_X - H_Y + (H_X)_c - (H_Y)_c$$

which is equal to $$\frac{m}{k} \cdot \frac{3dx}{x} - \frac{m}{k} \cdot \frac{3dx}{x^4} \cdot r \cdot \frac{3dx}{y^4}$$

It is therefore desired to have $$\frac{m}{k} \cdot \frac{3dx}{x^4}\left(1 - \frac{3rdx}{y^4}\right) = 0 \quad (3)$$

In order to comply with Equation 3, we must have the relation:

$$\frac{3rdx}{y^4} = 1 \quad (4)$$

It will therefore be seen that, $y$ and $dx$ being given, it is always possible to find a coefficient $r$ such that the total magnetic field difference between points X and Y is zero.

A second condition is that the field at point X must remain constant. If $H_0$ is the value of the earth magnetic field and $H_T$ the total value measured by head $T_1$ at X, we have:

$$H_T = H_0 \pm \frac{m}{k \cdot x^3}$$

without compensation and $$H_T = H_0 \pm \left(\frac{m}{k \cdot x^3} - \frac{m}{k} \cdot \frac{3dxr}{x^4 y^3}\right) \quad (5)$$

with compensation.

The measurement will be correct when the second term of Equation 5 is equal to zero. This corresponds to the following condition:

$$1 - \frac{3dxr}{xy^3} = 0 \quad (6)$$

This second condition (6), compared with the first condition (4), involves $x = y$, and we then find $$\frac{3dxr}{y^4} = 1$$

The relation $x = y$ means that the coils 16, 17 are located near the barycenter M of the magnetic masses $m$ producing the parasitic magnetic field.

If the barycenter moves with respect to the compensation coils, it is possible to calculate the error introduced by a small displacement of the barycenter, distance $y$ being fixed, whereas $x$, instead of being exactly equal to $y$, is equal to $y \pm dy$ ($dy$ thus representing the variations of the barycenter).

By replacing $y$ by this value in condition (6) and by calling $s$ the factor of error, we have:

$$s = 1 - \frac{3dx.r}{(y \pm dy)y^3} = 1 - \frac{3dx.r}{y^4(1 \pm q)}$$

$q$ being equal to $dy/y$.

Now in order to have $H_X - H_Y = 0$, we must have $$\frac{3dxr}{y^4} = 1$$

so that $$s = 1 - \frac{1}{1 \pm q}$$

If $q$ is small, $$\frac{1}{1 \pm q}$$

may be expanded into a series which gives, by stopping at the second term (because the third one is negligible):

$$\frac{1}{1 \pm q} = 1 \pm q$$

so that finally we have:

$$s = \pm q = \pm \frac{dy}{y}$$

By way of example, if it is supposed that barycenter M moves $\pm 0.5$ metre about point $M_1$ where coils 16 and 17 are located, distance $y$ being equal to 10 metres (this is the case in experiments performed on board a "Breguet Atlantic" aircraft), we have $$\frac{dy}{y} = \frac{1}{20}$$

and therefore, for variations of 2 gammas (1 gamma = $10^{-5}$ oersted), a maximum disturbance of 0.1 gamma which is quite acceptable. Besides, it has been found that the barycenter M of the induced and permanent magnetic fields moves so very little in an aircraft during a flight thereof when the cargo is fixed.

Finally it will be noted that, in the preceding calculations, account has not been taken of the projection of the parasitic field vector on the direction of the earth magnetic field, because it is unnecessary to take it into account due to the fact that it is the same for both of the heads $T_1$ and $T_2$, the final result being multiplied by the cosinus of the angle between the parasitic field vector and the magnetic field direction.

It will therefore be seen that the compensation system automatically performs compensation of the parasitic magnetic field produced by induced and permanent fields of barycenter M when this barycenter moves very little (case of a fixed cargo).

The method and device according to the present invention have, over existing methods and devices for the same purpose, many adavntages and in particular the following ones:

They ensure an automatic compensation of the parasitic magnetic fields.

The same device permits not only of performing such a compensation owing to the feedback loop between phase discriminator 13 and the coils (16 and 17) which produce the compensation magnetic field, but also of determining, by means of frequency meter 14, the intensity of the magnetic field free from the disturbances due to parasitic magnetic fields, and this with a high precision.

The operation of the device is reliable and its construction is little expansive.

We might, within the scope of the invention, dispose at point Y, which is at a greater distance from magnetic barycenter M than point X, magnetometer head $T_1$ the output of which is connected with frequency meter 14, so as further to reduce the influence of the residual disturbing magnetic field upon the frequency measured by the frequency meter, head $T_2$ being disposed at X.

What we claim is:

1. A device for the compensation of a parasitic magnetic field which comprises, in combination,
    means for determining the difference between the respective values of the total magnetic field at two points where the external magnetic field intensity is substantially the same whereas the respective values of the parasitic magnetic field are different,
    means for producing an electric current of an intensity substantially proportional to the difference between the respective magnetic field intensities at said points,
    conducting wire coils mounted in the vicinity of the barycenter of the magnetic masses producing said parasitic magnetic field, and
    means for feeding said electric current to said coils, the disposition of said coils and the coefficient of proportionality between said electric current and said magnetic field difference being chosen such that the compensation magnetic field created by said coils cancels said difference.

2. A device for the compensation of parasitic magnetic fields aboard an aircraft which comprises:
    in a first location, substantially in the vertical plane of symmetry of said aircraft, a magnetometer head adapted to deliver a first voltage of a frequency proportional to the intensity of the magnetic field in this first location;
    in a second location, substantially in the vertical plane of symmetry of said aircraft, a nuclear filter adapted to receive at its input a portion of said first voltage and to deliver at its output a second voltage the phase shift of which with respect to said first voltage is an angle propertional to the difference of the respective intensities of the total magnetic field in said two locations;
    a phase-discrimination unit adapted to receive on its two inputs said first voltage and said second voltage and to deliver on its output a third voltage proportional to the phase shift angle between said first voltage and said second voltage;
    a conversion unit having its input connected to the output of said phase-discrimination unit and adapted to deduce from said third voltage an electric current of an intensity substantially proportional thereto;
    conducting wire coils mounted in the vicinity of the barycenter of the magnetic masses producing said parasitic magnetic field;
    means for feeding said electric current to said coils;
    the disposition of said coils and the coefficient of proportionality between said electric current and said magnetic field difference being chosen such that the compensation magnetic field created by said coils cancels said difference;
    and a frequency meter measuring the frequency of said first voltage and therefore determining the intensity of the external magnetic field when the parasitic magnetic field is compensated.

3. A device according to claim 2 wherein there are two coils, the axes of said coils together with the longitudinal axis of the aircraft forming a trirectangular trihedron.

4. A method for determining the external magnetic field from an aircraft by compensation of parasitic magnetic fields which exist aboard said aircraft comprising:
    measuring the gradient of total magnetic field between a first point and a second point, one behind the other within said aircraft and lying substantially in the vertical plane of symmetry thereof;

providing coils located near the barycenter of the parasitic magnetic masses aboard said aircraft and feeding said coils with a current which is substantially equal to said gradient of total magnetic field multiplied by a proportionality factor;

setting said proportionality factor in such manner as to generate, by said coils, a compensating magnetic field tending to nullify said gradient, and determining the magnetic field from one of said points which is then equal to said external magnetic fields.

References Cited

UNITED STATES PATENTS 2,692,970 10/1954 Tolles _____ 324—43
2,891,216 6/1959 Linder _____ 324—43

RUDOLPH V. ROLINEC, *Primary Examiner.*

A. E. SMITH, *Assistant Examiner.*

U.S. Cl. X.R.

324—0.5